Feb. 24, 1948. R. D. PETERSEN 2,436,401
CUTTING MACHINE ATTACHMENT
Filed Oct. 16, 1945
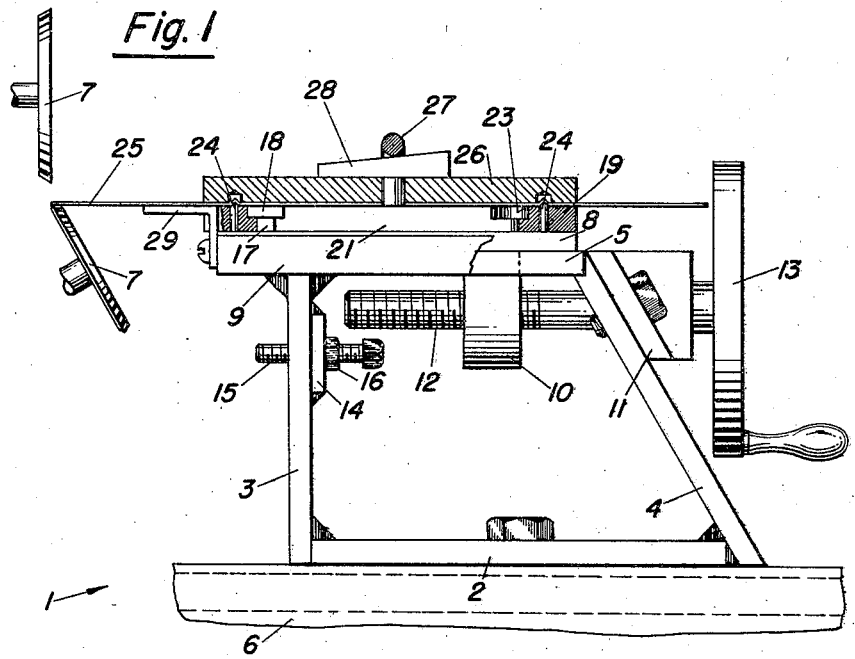
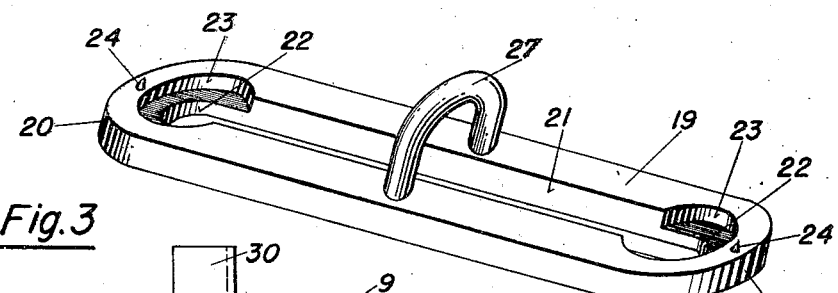
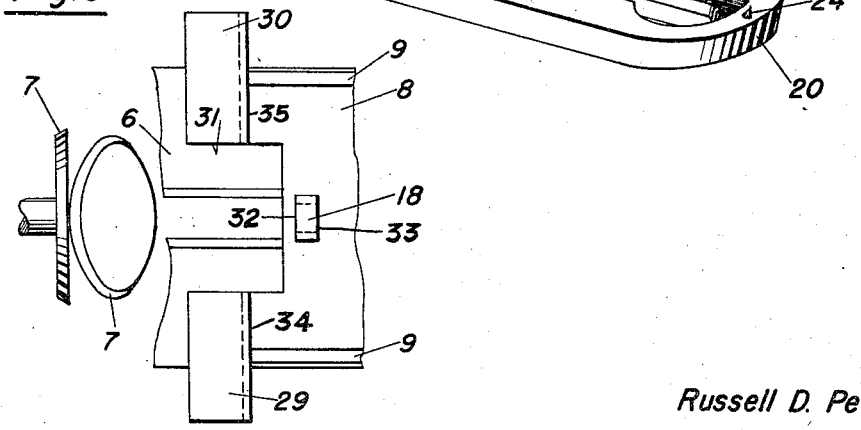
INVENTOR
Russell D. Petersen
BY
Ralph Chappell
ATTORNEY Patented Feb. 24, 1948

2,436,401

UNITED STATES PATENT OFFICE 2,436,401

CUTTING MACHINE ATTACHMENT

Russell D. Petersen, Bremerton, Wash.

Application October 16, 1945, Serial No. 622,661

3 Claims. (Cl. 164—63)

(Granted under the act of March 3, 1883, as amended April 30, 1928; 370 O. G. 757)

This invention relates to cutting machine attachments and more particularly to cutting machine attachments adapted to support and guide sheet material to be cut to various shapes, as, for example, to form gaskets.

Objects of the invention are to provide improved cutting machine attachments adapted to support sheet materials and guide the path of movement thereof past cutting blades to cut such materials to desired shapes; to provide improved cutting machine attachments of the type referred to in which various sizes of guided adapters may be provided to support sheet material to vary the size or dimension ratio of the article cut out therefrom; to provide improved cutting machine attachments in which the size of the cut article may be varied by adjustment of the attachment using a single size of adapter; and to provide improved cutting machine attachments particularly adapted to support material cut to form gaskets or other articles having straight sides and arcuate ends and capable of supporting the material during both external and internal cutting operations.

It is a further object of the invention to provide for carrying out the foregoing objects in a facile, economical and efficient manner.

In accomplishing these and other objects of the present invention, I have provided improved details of structure, the preferred form of which is illustrated in the accompanying drawing, wherein:

Fig. 1 is a side elevational view, partly in section, of a cutting machine attachment embodying the features of the present invention and showing the relation of the attachment to a pair of cutting blades.

Fig. 2 is a perspective view of an adapter plate employed in the attachment shown in Fig. 1.

Fig. 3 is a top plan view of a portion of the attachment, but omitting the adapter.

Referring more in detail to the drawing:

The cutting machine attachment of my invention comprises a frame 1, formed of metal or other suitable material, and preferably having a base 2, a forward upright 3, a rearward upright 4 and a longitudinally slotted top 5, all fixedly secured together, as by welding. The attachment may be supported on a foundation 6 adjacent a known type of cutting machine having one or more cutting blades 7, but otherwise not shown.

A bed 8 is supported on the top of the frame for longitudinal adjustment thereon, preferably being guided in such adjustment by appropriate guide means, as, for example, by side pieces or flanges 9 secured to the top member 5 and slidably receiving the sides of the bed. Additional guide means, as, for example, studs secured to one of the elements and riding in slots in the other element, may also be provided. The bed 8 has a depending boss 10 formed thereon and passing through the longitudinal slot in the top member 5. The boss 10 is longitudinally bored and tapped.

A bearing member 11 is secured to the rearward upright 4 and has a bore axially aligned with the tapped bore in the boss 10. An adjusting screw 12 is journaled in the bore in the bearing member 11, being retained therein by appropriate collar means, and is threadedly engaged within the tapped bore in the boss 10. Preferably an operating wheel 13 is fixed to the adjusting screw to facilitate manual rotation of the screw. It is seen that such rotation moves the bed longitudinally of the frame.

Preferably the bed 8 carries a longitudinal linear scale engraved or otherwise suitably marked thereon and one of the side pieces or flanges 9 carries a graduation cooperable with the scale. The attachment is positioned with respect to the cutting blades 7 in such manner that the scale indicates the size of the cut article.

Preferably the forward upright 3 carries a bearing member 14 which has a tapped aperture therethrough. A stop screw 15 is threadedly engaged therewith and is adapted to cooperate with the boss 10 to limit forward movement of the bed with respect to the frame. The stop screw may be retained in adjusted position by a lock nut 16.

The bed 8 carries an upstanding guide pin 17 rigidly fixed thereto. The pin 17 has a head 18 which has a pair of straight parallel sides 32 and 33 extending in a direction transverse to the direction of adjustment of the bed, being preferably rectangular and elongated in said direction, as shown in Fig. 3.

An adapter is provided to support material to be cut by the cutting blades and is movably supported on the bed 8. The adapter includes a lower plate 19 that has straight side edges and rounded semicircular ends 20, Fig. 2. The plate 19 has a central slot 21 that terminates in rounded ends 22. The centers about which the rounded ends of the plate and of the slot are constructed are coincidental. The slot 21 is adapted to slidably receive the pin 17 and the width of the slot is such as to receive sides 32 and 33 of the head 18 of the pin in snug sliding engagement.

The plate 19 has arcuate recesses 23 cut away in its upper face adjacent the ends 22 of the slot 21. The recesses 23 are of such size as to rotatably receive the head 18 of the pin when the adapter is moved to the limit permitted by engagement of the pin body with an end of the slot which is the position shown in Fig. 1. The plate 19 has a pair of pointed studs 24 to penetrate material supported thereon.

The material supported in the adapter is designated 25 and may be any sheet material to be cut, as, for example, gasket forming material to be cut to form gaskets. The material is impaled on the studs 24 and is clamped in the adapter on the plate 19 preferably by means of a second or upper adapter plate 26. The plate 19 preferably has an upstanding loop or bail 27 secured thereto and the plate 26 preferably has a transverse slot adapted to receive the bail. The plate 26 may be clamped down firmly on the plate 19 by a wedge element 28 inserted between the bail and the top of the plate 26.

The plate 19 may be of any desired size or have any desired dimension ratio. Preferably the plate 26 is substantially similar in outline to the plate 19.

A pair of angle iron brackets 29 and 30 may be secured to the forward end of the bed 8 to furnish a support for the material 25 projecting beyond the adapter. A leg of each of these brackets is co-planar with the top of the plate 19 so that the material is prevented from drooping.

The brackets 29 and 30 are spaced transversely, the space therebetween being designated 31, Fig. 3. The brackets are adapted to cooperate with the pin 17 to furnish additional guiding means for the adapter in a manner explained in the discussion of the operation of the invention.

Operation

A piece of sheet material 25 to be cut, as, for example, to form a gasket, is punctured by appropriate means to receive the loop or bail 27 and placed over the lower adapter plate 19 and impaled on the studs 24. The piece is clamped in such position by means of the upper adapter plate 26 and wedge element 28.

The bed 8 is adjusted longitudinally of the frame 1 until the scale indicates that it is in correct position for the external cut to be made in the material to form a cut article having the desired outside dimensions. The adapter assembly with the material 25 secured therein is placed transversely on the bed 8 with the pin 17 in the slot 21, and the cutting machine is started.

The adapter assembly is manually moved in a straight path transversely of the bed and frame, being guided in such movement by engagement of sides 32 and 33 of the head 18 of the pin within the slot 21, and of a side edge of the adapter with surfaces 34 and 35, respectively, of the brackets 29 and 30. During such movements the blades 7 cut the material 25 in a straight line.

When an end 22 of the slot 21 reaches the pin 17, the adapter is pivoted thereabout through a semicircle with the head 18 riding in the adjacent recess 23. The semicircular end portions 20 of the plate 19 and the corresponding end portions of the plate 26 ride through the space 31 between the brackets 29 and 30. In Fig. 1 plates 19 and 26 are shown midway in this 180° turn, therefore being momentarily disposed longitudinally of bed 8. When the adapter has described a complete semicircle, the opposite edges of the plates 19 and 26 engage one of the surfaces 34 or 35 of the brackets 29, 30 to prevent further rotary movement. During the rotary movement of the adapter the blades 7 cut the material in an arcuate path to form a semicircular end thereon.

After rotary movement has been completed, the adapter is moved through a straight path, again transverse to bed 8, and in a direction opposite to that of its first movement to cut the opposite side edge of the article. The opposite rounded end edge may also be cut as described hereinbefore.

On completion of an external cut, the bed 8 may be adjusted forwardly to the correct predetermined position for an internal cut to be made in the material. The position may likewise be determined from the scale on the bed. An internal cut may then be made in the same manner as the external cut.

It is seen that the size of the cut article or the ratio of external dimensions to internal dimensions may be varied as desired by adjustment of the position of the bed with respect to the cutting blades using the same adapter. The ratio of length to width of the cut article may be varied by use of different adapters.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In a device of the character described, a frame, a bed supported on said frame, means for adjusting the bed longitudinally with respect to the frame, a guide pin on said bed having an enlarged and substantially straight sided head elongated in a direction transverse to the direction of adjustment of said bed, a pair of transversely spaced brackets on said bed, and an adapter movably supported on said bed and including a plate having an elongated slot slidably receiving said pin, the width of the head of said pin approximating the width of said slot, whereby engagement of the head within the slot guides movement of the adapter to straight paths transverse to the direction of adjustment of said bed, said plate having surface portions cut away adjacent the ends of said slot adapted to rotatably receive the head of said pin to permit rotary movement of the adapter when the adapter is at an end of its path of straight travel, said brackets cooperating with the side edges of said plate to limit rotary movement of the adapter, said adapter having means adapted to secure a sheet of material therein, said last named means comprising an upstanding loop formed on said plate, a second plate of substantially similar outline to said first named plate and having a slot adapted to receive said loop, and a wedge element adapted to fit under said loop to secure said second named plate on said first named plate.

2. In a device of the character described, a frame, a bed supported on said frame, means for adjusting the bed longitudinally with respect to the frame, a guide pin on said bed having an enlarged and substantially straight sided head elongated in a direction transverse to the direction of adjustment of said bed, a pair of transversely spaced brackets on said bed, and an adapter movably supported on said bed and including a plate having an elongated slot slidably receiving said pin, the width of the head of said pin approximating the width of said slot, whereby engagement of the head within the slot guides movement of the adapter to straight paths transverse to the direction of adjustment of said bed, said plate having surface portions cut away adjacent the ends of said slot adapted to rotatably receive the head of said pin to permit rotary movement of the adapter when the adapter is at an end of its path of straight travel, said adapter having means adapted to secure a sheet of material therein.

3. In a device of the character described, a frame, a bed member supported on said frame, means for adjusting the bed member longitudinally with respect to the frame, an adapter having means adapted to secure a sheet of material therein and including a plate member supported on said bed member for sliding movement relative thereto, a guide pin on one of said members, the other of said members having an elongated slot slidably receiving said pin, said slot having a first portion so constructed and proportioned relative to said pin as to constrain relative motion between said pin and said slot to sliding, said slot having a second portion enlarged relative to said pin to permit relative rotary movement between said pin and said slot.

RUSSELL D. PETERSEN.

REFERENCES CITED

The following references are of record in the file of this patent:

UNITED STATES PATENTS

| Number | Name | Date |
|---|---|---|
| 2,127,002 | Murphy | Aug. 16, 1938 |